United States Patent
Smith

(10) Patent No.: US 6,204,837 B1
(45) Date of Patent: Mar. 20, 2001

(54) COMPUTING APPARATUS HAVING MULTIPLE POINTING DEVICES

(75) Inventor: Donald X. Smith, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/115,105

(22) Filed: Jul. 13, 1998

(51) Int. Cl.[7] .................. G09G 5/08; G09G 5/00
(52) U.S. Cl. ............ 345/157; 345/156; 345/161; 345/163; 345/167; 345/180
(58) Field of Search .................. 345/156, 160, 345/161, 163, 167, 173, 179, 145, 146

(56) References Cited

U.S. PATENT DOCUMENTS

| | | | |
|---|---|---|---|
| 5,404,524 | * 4/1995 | Celi, Jr. .................. | 395/700 |
| 5,473,347 | 12/1995 | Collas et al. ............ | 345/169 |
| 5,479,192 | 12/1995 | Carroll, Jr. et al. ...... | 345/168 |
| 5,732,228 | * 3/1998 | Jaaskelainen, Jr. ....... | 395/333 |
| 5,982,358 | * 11/1999 | Fleming, III .............. | 345/168 |

FOREIGN PATENT DOCUMENTS

0794502A1   9/1997   (EP) .................. G06K/11/18

* cited by examiner

*Primary Examiner*—Amare Mengistu
*Assistant Examiner*—Jimmy H. Nguyen

(57) ABSTRACT

An apparatus and method for configuring a computing device to support a plurality of pointing devices or a singular pointing device that can provide a plurality of functions. The computing device may be a desktop or portable unit. Several graphics menus for assigning functions to a pointing device are disclosed as well as logic for executing the assignment/configuration.

14 Claims, 2 Drawing Sheets

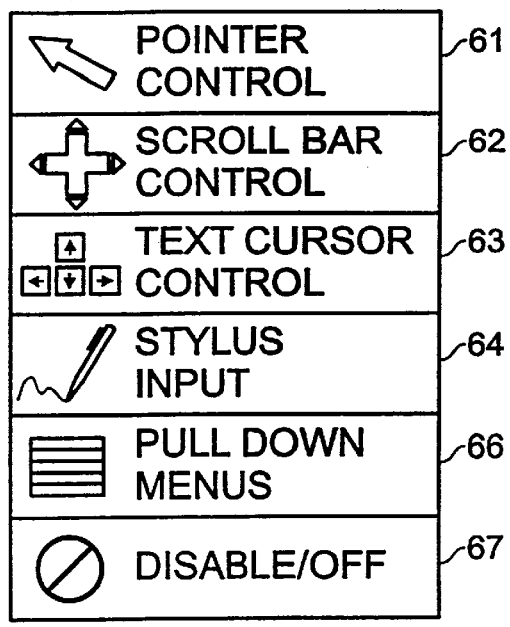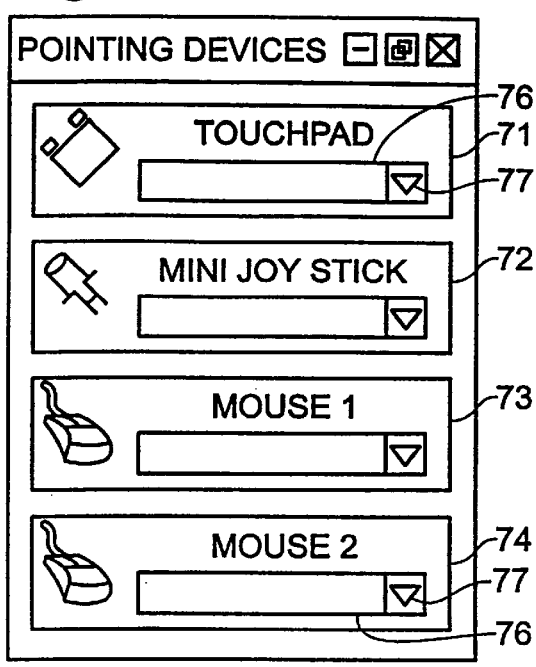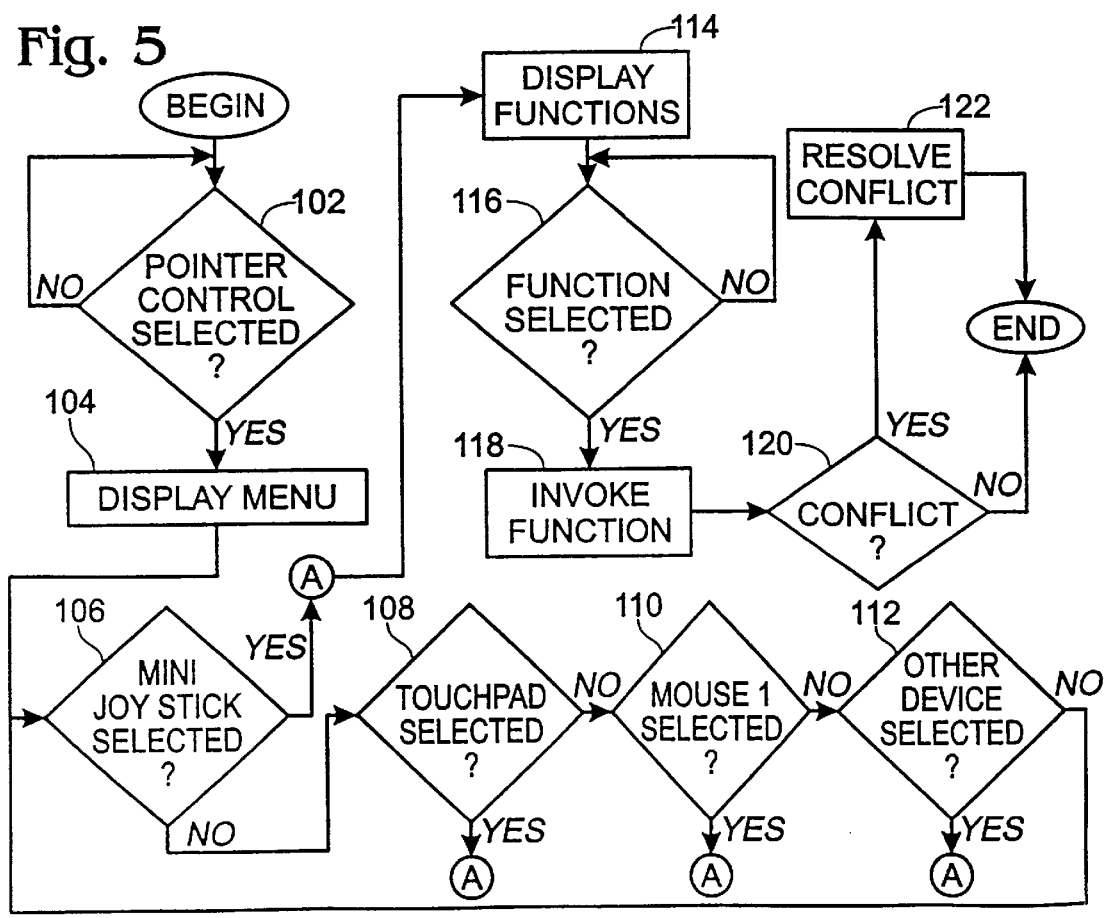

COMPUTING APPARATUS HAVING MULTIPLE POINTING DEVICES

FIELD OF THE INVENTION

The present invention relates to multiple pointing devices for a computing device and the control of such pointing devices. The present invention also relates to the provision and control of multiple pointing devices in a mobile computing or electronic device.

BACKGROUND OF THE INVENTION

Many types of pointing devices are known in the art and examples include a mouse, joystick, touchpad, track ball, computer tablet and touch screen, amongst others. These pointing devices typically function in conjunction with a graphical user interface (GUI) and are often associated with a particular graphics sprite or screen pointer such as an arrow, a large I, a hand, a finger, etc.

Popular GUIs include those provided in word processing applications such as MS Word and WordPerfect, those provided in spreadsheet applications such as Excel and Lotus and those provided in the Windows line of operating systems, etc. In a word processing application, for example, a pointing device is typically used to position a cursor amongst text on a screen, to activate scroll bar functions and to investigate and select from pull down or pop up menus (such as File, Edit, View, Format, etc.) and the like. To activate a scroll bar or to select a menu item, a user typically has to move the screen pointer to the scroll bar or item, depress a control button when the screen pointer is in an appropriate location and then reposition the screen pointer where desired in the text.

To eliminate the tedium and distraction of positioning and repositioning a screen pointer while scrolling through a document, one prior art device has incorporated a mechanism limited to the scrolling function within a conventional mouse. The mechanism is usually implemented as a wheel or the like and a user typically uses their thumb or finger to turn the wheel in the direction the user desires to scroll. Such a combined pointing device is intended primarily for Internet users who desire to scroll through web sites while having the main cursor available for page or hot link selections, etc. While this attempt provides some benefit, it also has disadvantageous aspects and fails to meet the needs of computing device users.

One of these disadvantageous aspects is that the additional scrolling mechanism is limited in function. There are many other graphical display scenarios and pointing device combinations that it would be desirable to achieve. These might include the ability to uniquely control two or more individual pointing devices or to configure one pointing device to be used for a plurality of functions. For example, a touchpad could be used in a first mode as a screen pointer and in a second mode as a stylus pad on which one can enter their signature on a letter or facsimile transmission.

Another disadvantageous aspect of the above described prior art pointing device is that it is only available in a desktop environment and not in a mobile computing environment. Non-desktop environments are more restrictive in what functions or components can be supported.

SUMMARY OF THE INVENTION

Accordingly, it is an object of the present invention to provide a computing or electronic device with multiple pointing devices that can perform various functions.

It is another object of the present invention to provide a computing device with multiple pointing devices in which a user may selectably control the function performed by each pointing device.

It is another object of the present invention to provide multiple pointing devices in a mobile computing device.

It is also on object of the present invention to provide the selectable control of multiple pointing devices in a mobile computing device.

These and related objects of the present invention are achieved by use of a computing apparatus having multiple pointing devices as described herein.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIG. 3 is a pull down or pop up menu for function assignment in accordance with the present invention.

FIG. 4 is an alternative graphics menu or window for assigning pointing device function in accordance with the present invention.

FIG. 5 is a flowchart of operation of function assignment logic in accordance with the present invention.

DETAILED DESCRIPTION

Figure 1:
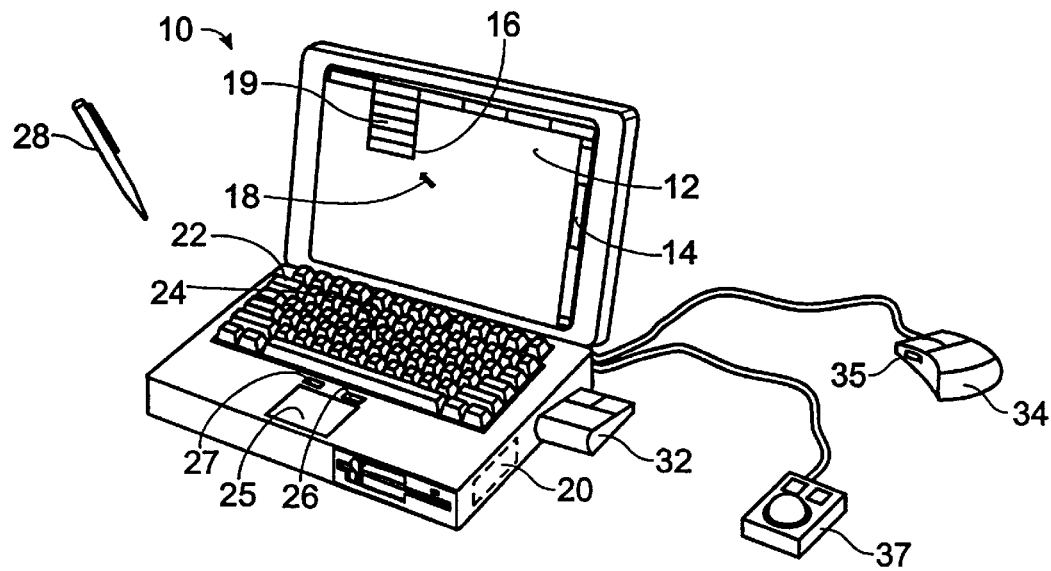
FIG. 1 is a perspective view of a computing device having a plurality of pointing devices in accordance with the present invention.

Referring to FIG. 1, a perspective view of a computing device having a plurality of pointing devices in accordance with the present invention is shown. Computing device 10 includes a screen 12 on which a GUI may be displayed. The GUI of FIG. 1 illustrates a scroll bar 14, a pull down menu 16, a primary screen cursor 18 and a plurality of pull down menu entries 19. While computing device 10 may be any type of computing device or electronic device, in a preferred embodiment, computing device 10 is a mobile computing or electronic device.

Computing device 10 also includes a processor or processing logic 20 (shown in phantom lines because it is provided internally), a keyboard 22, a mini-joystick 24, a touchpad 25 and control buttons 26,27. As discussed in more detail below, touchpad 25 can be configured for positioning main cursor 18 or as an input for a stylus or pen 28, for example, to permit a user to sign their name to a letter or circle text on a page, etc. A pop out or attached mouse 32, an external mouse 34 with scroll bar controller 35 and a trackball 37 are also illustrated in FIG. 1.

The present invention includes logic, for example, software executed by processor 20, that investigates the pointing devices connected to computing device 10 and permits a user to assign a predefined function to each of the detected pointing devices. Logic that investigates or "enumerates" which pointing devices are connected to computing device 10 is known in the art.

The present invention preferably operates at a layer between the operating system and application software or is integrated into the operating system. In a preferred embodiment, the present invention utilizes a plurality of graphics menus and a plurality of stored known pointing device configurations/settings to achieve the desired selectable arrangement of multiple pointing devices in a computing device. In the text which follows, several predefined graphics menus are discussed. It should be recognized that it would be apparent to one skilled in the art to achieve the functions of these menus in other graphics and non-graphics implementations without departing from the present invention.

Figure 2:
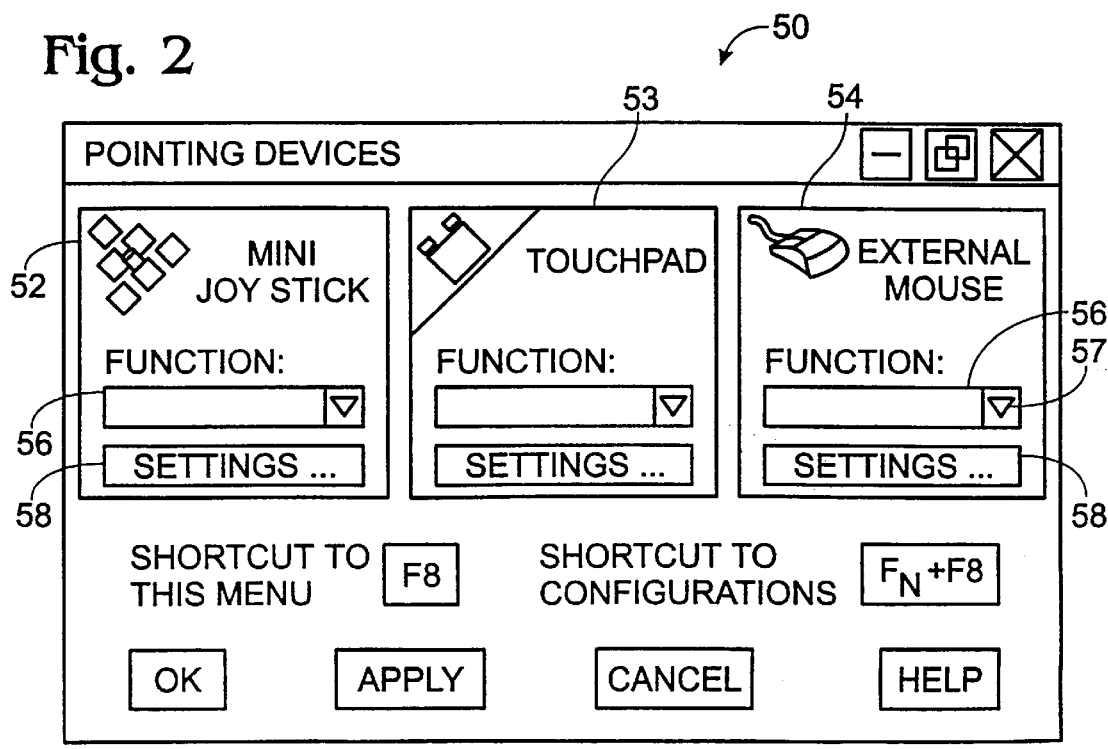
FIG. 2 is a graphics menu or window for assigning pointing device function in accordance with the present invention.

Referring to FIG. 2, a graphics menu or window 50 for assigning pointing device function in accordance with the present invention is shown. Pointer control menu 50 includes a pointing device window 52–54 for each pointing device detected during device enumeration. By way of example, a mini joystick (52), touchpad (53) and an external mouse (54) are illustrated as having been detected.

Each pointing device window 52–54 includes a function box 56 with an options icon 57 and a settings box 58 (not all of which are labeled with reference numerals to avoid crowding the figure). Settings box 58 permits a user to make setting selections (e.g. button orientation, speed, etc.) which may be specific to each type of device as known in the art. Menu 50 also preferably includes an indication of a shortcut key (F8) to menu 50 and a shortcut key (FN+F8, where FN is for shift, alt or cntl) to previously established configurations, e.g., shift+F8 may be a shortcut key to configuring the touchpad for stylus input. Standard windows for OK, APPLY, CANCEL, and HELP are also provided.

Menu 50 functions generally as follows. To assign a particular function to a pointing device, a user clicks on (or otherwise selects) the options icon 57 in the function box 56 of the desired device. This causes the function menu 60 of FIG. 3 to appear. Note that during boot up and before a user's initial pointing device assignmnent, one or more of the available pointing devices is assigned the primary pointer function. This device (or devices) may be touchpad 24, an external mouse 34 or another device as chosen by the computing device maker and permits a user to run menu 50.

Referring to FIG. 3, a pull down or pop up menu 60 for function assignment is shown in accordance with the present invention. Menu 60 provides a plurality of entries 61–67 that each invoke a programmed or predefined pointing function. These entries include main cursor or main pointer control 61, scroll bar or "panning" control 62, text cursor control 63, stylus input 64, pull down and/or pop up menu control 66 and device disable 67. User selection of one of these entries causes that entry to appear in function box 56. A user then clicks on the APPLY or OK box as appropriate and the selected function is assigned to the appropriate device, i.e., the driver for the particular function is assigned to the subject pointing device and responds to movement of that pointing device. Various conflict checks and the like are preferably performed as discussed below to assure that the assignment is proper.

Referring to FIG. 4, an alternative graphics menu or window 70 for assigning pointing device function in accordance with the present invention is shown. In menu 70, all detected pointing devices appear in a pointing device window 71–74. A function box 76 and an options icon 77 are provided for each pointing device window 71–74. Each function box 76 and options icon 77 function in the same manner as function box 56 and options icon 57 of FIG. 2. Selection of options icon 77 causes pop up menu 60 to appear at the corresponding function box 76. A function 61–67 is assigned by double clicking or entering a carriage return or the like on the highlighted function.

Referring to FIG. 5, a flowchart of operation of function assignment logic in accordance with the present invention is shown. In step 102, a determination is made as to whether a user has selected pointing device control, e.g., from an operating system menu in the same initial window as "control panel" and "printer control" or by depressing the shortcut key F8 or the like. If it has, menu 50 (or 70) is displayed (step 104). In step 106, a determination is made as to whether the options icon of the first detected device, e.g., a mini-joystick, has been selected. If it has, menu 60 is displayed in the mini-joystick function box 56,76 (step 114). If not, flow passes to step 108.

In step 116, a determination is made as to whether a function from menu 60 has been selected. If it has, that function is assigned to the appropriate pointing device in step 118. In step 120 a conflict check is performed, for example, to determine if two devices have been assigned conflicting functions.

In step 122, conflicts are resolved by not permitting the assignment of a subsequent conflicting device, prompting a user to adjust setting values (COM ports, etc.) and in other known manners.

In step 108,110,112, determinations are made as to whether the options icon for other detected devices has been selected. If not, flow continues as indicted. If so, flow continues from each of these steps to step 114 where function menu 60 is displayed for the particular pointing device. Flow continues from step 114 as discussed above.

Referring to Table I below, this table provides a list of possible assignments for a computing device that has two detected or enumerated pointing devices. The assignment of primary pointer (or main cursor) control to two devices as shown in the table provides redundancy which amongst other features prolongs the viable life of a computing device, i.e., the device will continue to function properly even after one of the pointing devices has failed. This is particularly beneficial in a mobile computing device where components are less interchangeable than in a desktop environment and tend to be small, lightweight and more fragile.

TABLE I

|  | First Device:<br>Mini Joystick | Second Device:<br>Touch Pad |
|---|---|---|
| Sample Config. 1: | Primary Pointer Control | Scroll Bar Control |
| Sample Config. 2: | Scroll Bar Control | Primary Pointer Control |
| Sample Config. 3: | Primary Pointer Control | Stylus Input ("pen") |
| Sample Config. 4: | Primary Pointer Control | OFF/Disabled |
| Sample Config. 5: | OFF/Disabled | Primary Pointer Control |
| Sample Config. 6: | Primary Pointer Control | Primary Pointer Control |
| Sample Config. 7: | Primary Pointer Control | Text Cursor Control |

With inspect drivers and low-level BIOS, they are preferably configured such that raw pointing device events are dispatched to the appropriate system and application layers. In other words, pointing device motion events are identified for immediate screen pointer reaction. Scrolling events are dispatched to the appropriate application layers. Stylus events on the touchpad are also identified and sent to the appropriate application. This may also be the case for text cursor control, through in an alternative embodiment these events can be passed through by synthetically generating the corresponding keyboard events at the up, down, left and right arrow keys.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A computing apparatus, comprising:

processor logic;

a display signal propagating mechanism coupled to said processor logic;

a data input signal propagating mechanism coupled to said processor logic that permits a user to input data;

logic within said processor logic that detects pointing devices coupled to said computing apparatus;

pointing device function select logic that permits a user to select the function to be assigned to at least two detected pointing devices, the assigned function for each detected pointing device being from the group of functions including:

primary screen pointer control, scroll bar control, panning control, text cursor control, stylus input, pull down menu control, pop up menu control and disabled state; and conflict logic coupled to said select logic that assesses whether an attempt is made to assign the same function to two pointing devices.

2. The apparatus of claim 1, wherein said function select logic permits a user to individually select a function to be assigned to each of two detected pointing devices.

3. The apparatus of claim 1, wherein said conflict logic does not permit the same function, except disabled state, to be assigned to two detected pointing devices at the same time.

4. The apparatus of claim 3, further comprising GUI logic coupled to said select logic that creates a graphics user interface (GUI) from which a user designates the function from said group of functions to be assigned to each of said at least two detected pointing devices.

5. A computing apparatus, comprising:

processor logic;

a display signal propagating mechanism coupled to said processor logic;

a data input signal propagating mechanism coupled to said processor logic that permits a user to input data;

logic within said processing logic that detects a pointing device coupled to said computing apparatus;

GUI logic that creates a graphics user interface (GUI) that permits user selection of a specific function to be assigned to each of two or more detected pointing devices;

assigning logic responsive to user selections from said GUI that assigns a selected function to a detected pointing device; and conflict logic that assesses whether an attempt has been made to assign the same function to two different pointing devices.

6. The apparatus of claim 5, wherein said GUI logic permits a user to select, for each of at least two detected pointing devices, a function from the group of functions comprising: primary screen pointer control, scroll bar control, panning control, text cursor control, stylus input, pull down menu control, pop up menu control and disabled state.

7. The apparatus of claim 6, wherein said conflict logic prevents the same function, except disabled state, from being assigned to two pointing devices at the same time.

8. The apparatus of claim 5, wherein said assigning logic is capable of assiging one of the following pairs of functions to two detected pointing devices in response to user selection of same: primary pointer control (PPC) and scroll bar control; PPC and stylus input; PPC and disabled; PPC and pull down or pop up menu control; text cursor control and scroll bar control; and text cursor control and pull down or pop up menu control.

9. A computing apparatus, comprising: processor logic;

a display mechanism coupled to said processor logic that displays a signal output from said processor logic;

a data input mechanism coupled to said processor logic that permits a user to input data;

a first pointing device coupled to said processor logic;

a second pointing device coupled to said processor logic;

GUI logic that creates a graphics user interface (GUI) via said display mechanism and that permits user selection of two different functions to be assigned contemporaneously to said first and said second pointing devices, said GUI logic permitting user selection of a function from the group of functions including: primary screen pointer control, scroll bar control, panning control, text cursor control, stylus input, pull down menu control, pop up menu control and disabled state;

assigning logic responsive to user selections from said GUI that assigns a first selected function to said first pointing device and a second selected function to said second pointing device; and conflict logic that assesses whether an attempt has been made to contemporaneously assign the same function from said group of functions to said first pointing device and said second pointing device.

10. The apparatus of claim 8, wherein said first pointing device and said second pointing device are different and are each from the group of pointing devices including: mini-joystick, mouse, touchpad, trackball, joystick, stylus input and touch screen.

11. The apparatus of claim 9, wherein said first pointing device is a touchpad and said two different functions are primary screen pointer control and stylus input.

12. The apparatus of claim 11, wherein said computing apparatus is a portable computing apparatus.

13. A method of configuring a computing apparatus, comprising:

providing a computing apparatus having processor logic, a display signal propagating mechanism and a data input signal propagating mechanism;

detecting at least a first pointing device and a second pointing device coupled to said computing apparatus;

generating a graphics user interface (GUI) that permits user selection of one of a plurality of different functions to be assigned to each of the detected first and second pointing devices, said plurality of different functions including at least two functions from the group of functions including: primary screen pointer control, scroll bar control, panning control, text cursor control, stylus input, menu control and disabled state;

assigning different selected function to each of the detected first and second pointing devices; and assessing whether an attempt has been made to assign the same function to both the first and second detected pointing devices.

14. The method of claim 13, wherein said detecting step includes the step of detecting at least one of the group of pointing devices including a mini-joystick, mouse, touchpad, trackball, joystick, stylus input and touch screen.

* * * * *